United States Patent
Underwood et al.

(10) Patent No.: US 6,700,762 B2
(45) Date of Patent: Mar. 2, 2004

(54) FILTER-SWITCHED DRIVE OPERATING MODE CONTROL

(75) Inventors: Michael Underwood, Owasso, OK (US); Ryan B. Ashbaugh, Claremore, OK (US); Norman W. Ritchie, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 336 days.

(21) Appl. No.: 09/943,913

(22) Filed: Aug. 31, 2001

(65) Prior Publication Data

US 2002/0024783 A1 Feb. 28, 2002

Related U.S. Application Data

(60) Provisional application No. 60/229,428, filed on Aug. 31, 2000.

(51) Int. Cl.$^7$ .................................. H02H 9/00
(52) U.S. Cl. ..................... 361/56; 361/111; 318/811; 363/39
(58) Field of Search ..................... 361/23, 33, 52, 361/56, 91.1, 110, 111; 417/44.1; 318/802, 811, 458, 798, 727; 363/37, 39, 40, 41, 45–47, 50, 78

(56) References Cited

U.S. PATENT DOCUMENTS

| 4,138,715 | A | * | 2/1979 | Miller ......................... 363/28 |
| 4,309,734 | A | | 1/1982 | Warren ........................ 361/58 |
| 5,844,397 | A | | 12/1998 | Konecny et al. ............ 318/811 |
| 5,909,098 | A | | 6/1999 | Konecny et al. ............ 318/811 |
| 5,982,136 | A | | 11/1999 | Pelly .......................... 318/801 |
| 6,045,333 | A | * | 4/2000 | Breit .......................... 417/44.1 |
| 6,586,900 | B2 | * | 7/2003 | Rider et al. ................. 318/459 |
| 6,587,037 | B1 | * | 7/2003 | Besser et al. .......... 340/310.01 |

FOREIGN PATENT DOCUMENTS

| EP | 0 978 919 A2 | 2/2000 | ............ H02H/9/08 |
| JP | 07222351 | 8/1995 | ............ H02H/7/085 |
| WO | WO 00/64024 | 10/2000 | ............ H02H/9/02 |

* cited by examiner

Primary Examiner—Ronald W. Leja

(57) ABSTRACT

A controller for a pulse width modulated electrical drive or a dual-mode, pulse width modulated/variable voltage inverter drive is coupled to sensors within a filter at the drive output. Upon detecting failure of the filter or filter components (e.g., a capacitor short or blown fuse) through the sensors, the controller either shuts down the drive or automatically switches the drive operating mode to an output mode which does not require filtering. Damage to the electrical system or downhole equipment from transmission of unfiltered or improperly filtered power may thus be averted upon failure of the filter or a filter component.

20 Claims, 3 Drawing Sheets

FILTER-SWITCHED DRIVE OPERATING MODE CONTROL

CROSS-REFERENCE TO RELATED APPLICATIONS

This application claims priority to provisional U.S. patent application Ser. NO. 60/229,428 entitled "FILTER-SWITCHED DRIVE OPERATING MODE CONTROL" and filed Aug. 31, 2000. The content of the above-identified patent application is hereby incorporated by reference.

TECHNICAL FIELD OF THE INVENTION

The present invention is directed, in general, to power systems for subterranean bore hole equipment and, more specifically, to controlling an electrical power drive to prevent damage to subterranean borehole equipment powered by the power drive.

BACKGROUND OF THE INVENTION

Electrical submersible pump (ESP) systems are frequently employed in the lower portion of a well bore for oil and/or gas producing wells, above or below the casing perforations. ESP pumps are generally employed to pump fluids to the surface or in water flooding for secondary recovery of oil and other hydrocarbon fluids. Normally ESP pumps are driven by downhole motors which are, in turn, powered by three phase power transmitted into the borehole from an electrical drive at the surface.

Various types of electrical drives have been employed or proposed for powering the motor portion of ESP systems, including variable frequency drive (VFD) systems. VFD drives may employ either variable voltage inverter (VVI) or pulse width modulated (PWM) output configurations. While each type of output provides various benefits in use with ESP systems, PWM drives are economical and provide variable speed operation. However, PWM output drives often exhibit voltage spikes and over-voltages as a characteristic of the output voltage waveform, which may result in motor failures and damage to ESPs from contra-rotating torques and other problems, as well as damage to the downhole motor and/or cable insulation. Transmission of stepped-up voltage outputs from PWM output drives over cables of significant length (e.g., anything greater than approximately 2,000 feet) may result in resonance or sequence harmonics for the high frequency carrier signal. Therefore use of PWM drives to drive downhole motors within ESP systems is generally impractical without regulating filter device between the PWM drive output and the step-up transformer (if any).

During operation, however, filters employed for PWM drive outputs being transmitted downhole may fail (from an internal capacitor failure or a fuse blowing within the filter, for example), thus negating the protection provided by the filter.

There is, therefore, a need in the art for a mechanism for safely utilizing filtered PWM drive output to power an ESP. It would be advantageous for such a mechanism to allow pumping operations by the ESP to continue despite the failure of a filter at the output of the PWM drive.

SUMMARY OF THE INVENTION

To address the above-discussed deficiencies of the prior art, it is a primary object of the present invention to provide, for use in downhole production system, a controller for a pulse width modulated electrical drive or a dual-mode, pulse width modulated/variable voltage inverter drive coupled to sensors within a filter at the drive output. Upon detecting failure of the filter or filter components (e.g., a capacitor short or blown fuse) through the sensors, the controller either shuts down the drive or automatically switches the drive operating mode to an output mode which does not require filtering. Damage to the electrical system or downhole equipment from transmission of unfiltered or improperly filtered power may thus be averted upon failure of the filter or a filter component.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith, " as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1A:
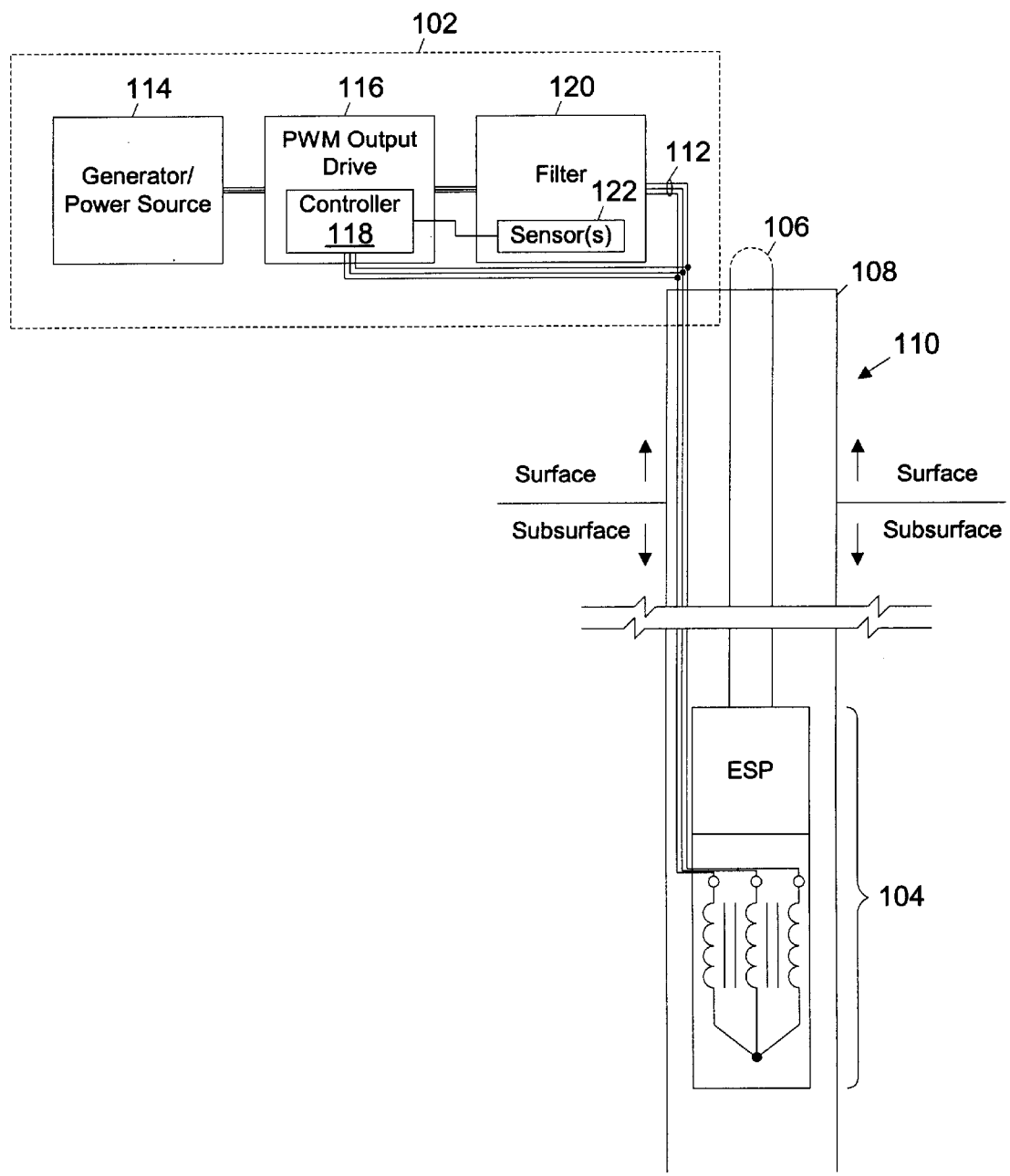
FIGS. 1A and 1B depict electrical power systems employed to power a downhole production system according to one embodiment of the present invention.
Figure 1B:
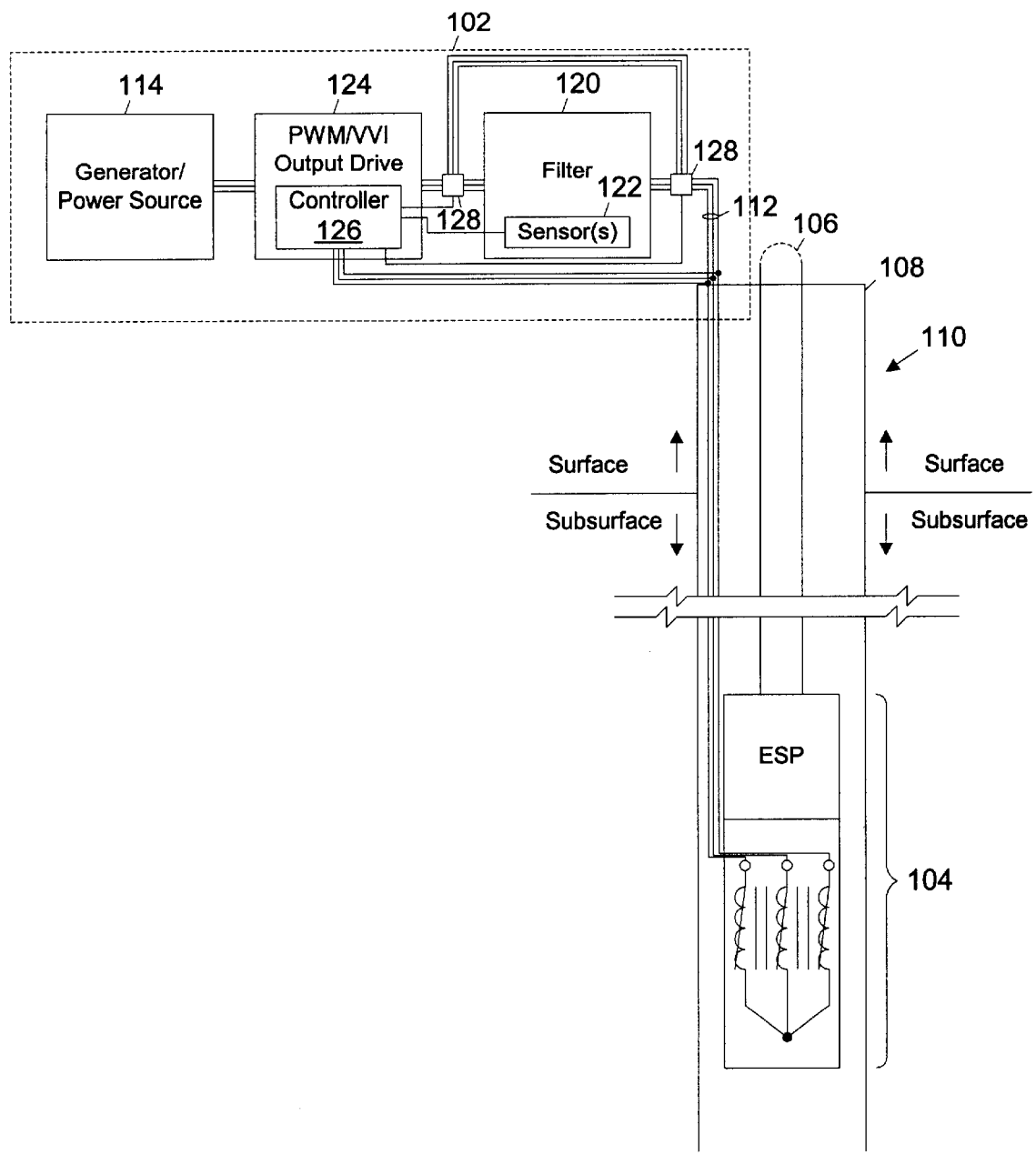
Figure 2:
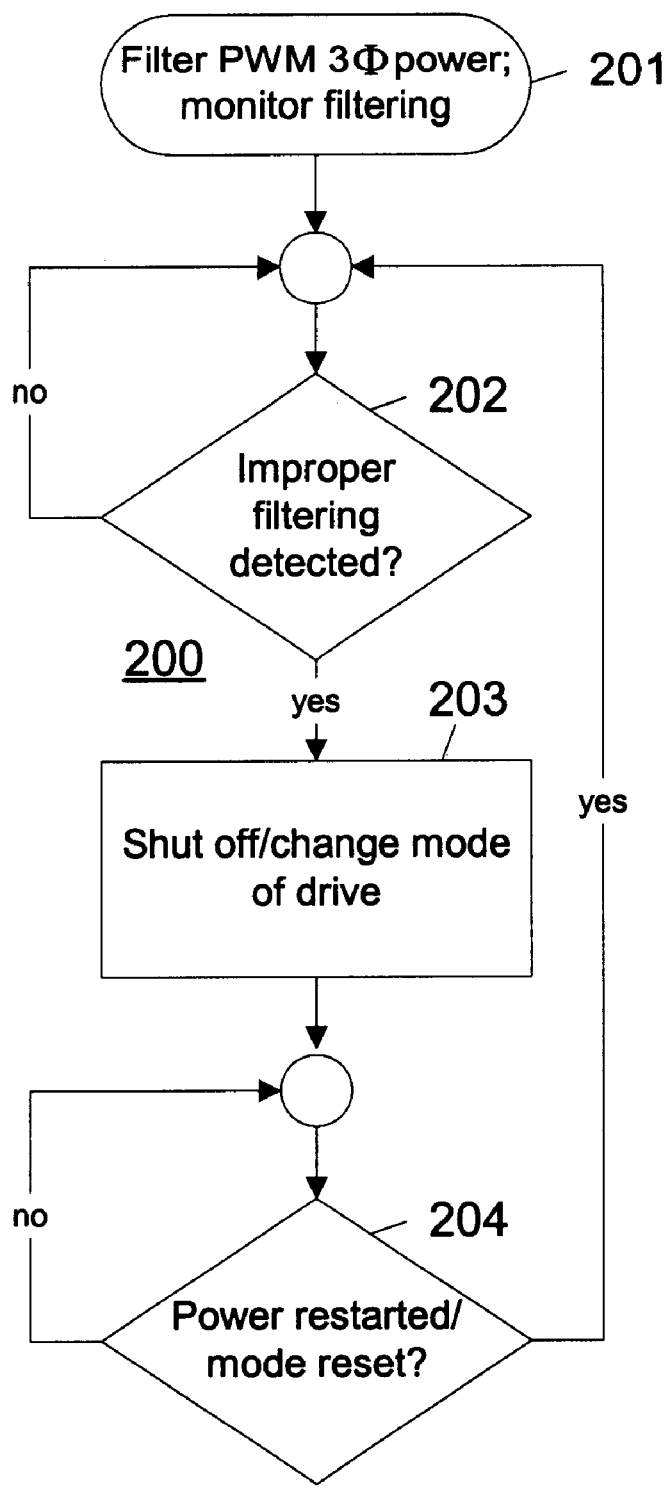
FIG. 2 is a high level flowchart for a process of controlling operation of a PWM or dual mode drive providing power to an ESP system downhole according to one embodiment of the present invention.

FIGS. 1A–1B and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIGS. 1A and 1B depict electrical power systems employed to power a downhole production system according to one embodiment of the present invention. The electrical power system 102 is coupled to a motor and pump assembly 104 adapted for use within a borehole and preferably disposed within the borehole by connection to tubing 106 lowered within the casing 108 for a well 110. Motor and pump assembly 104 in the exemplary embodiment includes an electrical submersible pump (ESP), which may be of the type disclosed in U.S. Pat. No. 5,845,709, coupled to an induction motor driving the ESP. The motor is powered by three phase power transmitted over three phase transmission cable 112 electrically coupling motor and pump assembly 104 to a surface power source within power system 102.

In addition to cable 112, power system 102 includes a generator or other source 114 of three phase power, which may be a connection to a local power grid and may optionally include conversion of single phase power to three phase power. Power source 114 is connected to an electrical power drive 116, which receives power from power source 114 and converts the received power into three phase power of the desired frequency and waveform. In the embodiment of FIG. 1A, power drive 116 is a pulse width modulated (PWM) output drive, the operation of which is controlled by a controller 118. Although depicted as a separate subcomponent within power drive 116, preferably controller 118 is actually fully integrated with power drive 116.

Connected to the output of PWM output drive 116 is a filter device 120 which filters the power output of PWM output drive 116 prior to transmission of the power downhole on cable 112. Filter device 120 may be any device installed at the output of drive 116 to reduce harmoninc distortion of the electrical waveforms, and may be either passive or active. Several suitable filters are commercially available from enterprises producing ESPs and from specialty manufacturers.

Filter device 120 includes one or more sensors 122 which detect failure of the filter or filter components, such as a capacitor failure (short) or blown fuse. Several commercially available three phase power filters currently employed in downhole power systems include such sensors. Sensors 122 are connected to drive controller 118, which automatically shuts down operation of PWM output drive 116 upon detecting failure of the filter device 120 or any component within filter device 120. By terminationg operation of PWM output drive 116 when failure of a filter device 120 or a component therein (i.e., improper filtering) is detected, damage to cable 112 and/or motor and pump assembly 104 which might otherwise result from utilizing the unfiltered or improperly filtered output of PWM drive 116 for three phase power may be avoided.

While the exemplary embodiment utilizes sensors 122 within filter device 120 to control operation of PWM output drive 116 through controller 118, controller 118 may also be connected to the output of filter device 120. By monitoring the frequency, amplitude, and waveform of power at the output of filter device 120 which is to be transmitted downhole, and comparing such measured characteristics to expected output power characteristics, faulty operation of filter device 120 may be detected and controller 118 may shut down PWM output drive 116 before damage can occur.

FIG. 1B depicts an alternative embodiment of the present invention, in which the electrical drive 124 between the power source 114 and filter device 120 is a dual output mode drive capable of either PWM or variable voltage inverter (VVI) n-step (e.g., 6-step, 12-step or 18-step) operation, and capable of switching operating modes during operation. The GCS VSC drive available from Centrilift, Inc. of Claremore, Okla. is a suitable drive for this purpose. Since VVI drives do not require filtering in use with an ESP, when a malfunction of filter device 120 is detected by controller 126 in one of the manners described above, drive 124 is simply automatically switched from PWM output mode to VVI/6-step (or 12-step, or 18-step, etc.) output mode, rather than shutting down the entire system as in the embodiment of FIG. 1A described above. This allows operation of the installation to continue while a replacement filter is obtained and/or installed or repairs are made.

Switches 128 selectively operated by controller 128 permit transmission of output power from drive 126 to bypass filter device 120, allowing the filter to be replaced and the drive 126 to then be manually switched back to PWM mode without halting operation. The topological location of switches 128 and/or the filter bypass method employed may vary widely depending on the design of filter device 120.

Although not depicted in FIGS. 1A or 1B, a step-up transformer may be employed at the output of the power drive connected to the cable transmitting power to the ESP. The filter employed by the present invention may be connected on either the drive side or the ESP side of such a step-up transformer, although preferably connected on the drive side.

FIG. 2 is a high level flowchart for a process of controlling operation of a PWM or dual mode drive providing power to an ESP system downhole according to one embodiment of the present invention. The process 200 is performed whenever pulse width modulated three phase power is produced for transmission into a borehole. The process begins by initiating filtering of the pulse width modulated three phase power prior to transmission into the borehole and monitoring the filtering (step 201).

The process then passes to a determination of whether improper filtering of the power is detected (step 202), either by detecting failure of the filter or a component therein or by detecting voltage spikes or over-voltages in the filtered power. When improper filtering is detected, the operating state of the drive producing the power is changed (step 203). That is, the drive is automatically shut off or switched to an operating mode other than a PWM output mode. Alternatively, transmission of the improperly filtered power is into the borehole may be otherwise terminated by, for example, decoupling the cable from the filter. Once power is restarted or the pulse width modulated operating mode restored (step 204)—manually after repair or replacement of the filter, for instance—checks for improper filtering of the power to be transmitted into the borehole are again resumed.

It is important to note that while the present invention has been described in the context of a fully functional electrical power system, those skilled in the art will appreciate that at least portions of the mechanism of the present invention is capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

The present invention enables a PWM or dual-mode drive employed to power and ESP to safely shut down or change mode automatically based on the functionality of the filter at the drive output. If the filter or a component therein fails, the drive is automatically shut down or automatically switched to an operating mode which does not require filtering in order to prevent damage to the power system and downhole equipment.

Although one or more embodiments of the present invention have been described in detail, those skilled in the art will understand that various changes, substitutions and alterations herein may be made without departing from the spirit and scope of the invention it its broadest form.

What is claimed is:

1. For use in a downhole production system, an electrical power system for providing three phase power without damage to the power system or downhole equipment comprising:
   a power source capable of selectively producing pulse width modulated three phase power for transmission over a cable into a borehole;
   a filter capable of filtering the power produced by the power source prior to transmission over the cable; and
   a controller capable of monitoring the filtered power and, responsive to detecting improper filtering of the power by the filter, either disabling transmission of power into the borehole by the power source or changing an operating mode of the power source.

2. The electrical power system of claim 1 wherein the power source further comprises:
   a pulse width modulated output drive, wherein the controller shuts off the drive in response to detecting improper filtering of the power by the filter.

3. The electrical power system of claim 1 wherein the power source further comprises:
   a dual mode drive capable of operating in either a pulse width modulated output mode or a variable voltage inverter output mode and capable of selectively switching between modes during operation, wherein the controller is adapted to switch the drive from the pulse width modulated output mode to the variable voltage inverter output mode in response to detecting improper filtering of the power by the filter when the drive is operating in the pulse width modulated output mode.

4. The electrical power system of claim 1 wherein the filter further comprises:
   one or more sensors adapted to detect failure of the filter or a component therein, wherein the controller is coupled to each sensor.

5. The electrical power system of claim 4 wherein the one or more sensors are adapted to detect a shorted capacitor, a blown fuse, or both within the filter.

6. The electrical power system of claim 1 wherein the controller is coupled to the output of the filter and monitors the filtered power for voltage spikes and over-voltages.

7. For use in a downhole production system, a filter-switched drive comprising:
   an electrical drive capable of selectively producing pulse width modulated three phase power; and
   a controller for the drive adapted to receive sensor signals relating to operation of a filter coupled to an output of the drive,
   wherein the controller is configured to respond to improper filtering of power produced by the drive by either terminating transmission of power from the drive or changing an operating mode of the drive.

8. The filter-switched drive of claim 7 wherein the electrical drive comprises a pulse width modulated output drive, wherein the controller is configured to shut off the drive in response to detecting improper filtering of the power produced by the drive.

9. The filter-switched drive of claim 7 wherein the electrical drive comprises a dual mode drive capable of operating in either a pulse width modulated output mode or a variable voltage inverter output mode and capable of selectively switching between modes during operation, wherein the controller is configured to switch the drive from the pulse width modulated output mode to the variable voltage inverter output mode in response to detecting improper filtering of the power produced by the drive when the drive is operating in the pulse width modulated output mode.

10. The filter-switched drive of claim 7 wherein the controller is adapted to receive and respond to signals from one or more sensors within the filter, each sensor detecting a shorted capacitor or a blown fuse within the filter.

11. A downhole production system comprising:
    a pump disposed within a borehole;
    a motor physically coupled to the pump;
    a three phase power cable electrically connecting the motor to a surface location;
    a three phase power source;
    an electric drive coupled between the power source and the cable, the electric drive converting power from the power source to pulse width modulated three phase power for transmission over the cable into the borehole;
    a filter coupled between the electric drive and the cable, the filter filtering the converted power output by the electric drive prior to transmission over the cable; and
    a controller coupled to the electric drive and the filter and monitoring filtering by the filter of the converted power output by the electric drive, the controller, in response to detecting improper filtering of the converted power by the filter, changing an operating state of the electric drive.

12. The downhole production system of claim 11 wherein the electric drive further comprises:
    a pulse width modulated output drive, wherein the controller shuts off the drive in response to detecting improper filtering of the converted power by the filter.

13. The downhole production system of claim 11 wherein the electric drive further comprises:
    a dual mode drive capable of operating in either a pulse width modulated output mode or a variable voltage inverter output mode and capable of selectively switching between modes during operation, wherein the controller switches the drive from the pulse width modulated output mode to the variable voltage inverter output mode in response to detecting improper filtering of the converted power by the filter when the drive is operating in the pulse width modulated output mode.

14. The downhole production system of claim 11 wherein the filter further comprises:
    one or more sensors adapted to detect failure of the filter or a component therein, wherein the controller is coupled to each sensor.

15. The downhole production system of claim 14 wherein the one or more sensors each detect either a shorted capacitor or a blown fuse within the filter.

16. The downhole production system of claim 11 wherein the controller is coupled to an output of the filter and monitors the filtered converted power at the output of the filter for voltage spikes and over-voltages.

17. A method of protecting production equipment within a borehole from damage comprising:

filtering pulse width modulated three phase power prior to transmission into the borehole to eliminate voltage spikes and over-voltages;

monitoring the filtering of the power; and responsive to detecting improper filtering of the power, either terminating transmission of three phase power into the borehole or switching an operating mode of an electric drive producing the power.

18. The method of claim 17 wherein the step of producing pulse width modulated three phase power for transmission into the borehole further comprises:

employing a pulse width modulated output drive to convert power to the pulse width modulated three phase power, wherein a controller shuts off the drive in response to detecting improper filtering of the converted power by the filter.

19. The method of claim 17 wherein the step of producing pulse width modulated three phase power for transmission into the borehole further comprises:

employing a dual mode drive to convert power to the pulse width modulated three phase power, the dual mode capable of operating in either a pulse width modulated output mode or a variable voltage inverter output mode and capable of selectively switching between modes during operation, wherein a controller switches the drive from the pulse width modulated output mode to the variable voltage inverter output mode in response to detecting improper filtering of the converted power by the filter when the drive is operating in the pulse width modulated output mode.

20. The method of claim 17 wherein the step of monitoring the filtering of the power further comprises:

detecting either a shorted capacitor or a blown fuse within the filter filtering the power.

* * * * *